United States Patent [19]

Flynn

[11] Patent Number: 4,479,465

[45] Date of Patent: Oct. 30, 1984

[54] FUEL-MEASURING FLOW SYSTEM FOR DIESEL ENGINES

[76] Inventor: Robert E. Flynn, 953 No. Greer Ave., Covina, Calif. 91724

[21] Appl. No.: 490,456

[22] Filed: May 2, 1983

[51] Int. Cl.$^3$ ............................................. F02M 37/00
[52] U.S. Cl. ................................. 123/514; 73/119 A; 73/114
[58] Field of Search ................. 123/514, 516, 510–513; 73/119 A, 113, 114

[56] References Cited

U.S. PATENT DOCUMENTS

| | | | |
|---|---|---|---|
| 1,573,176 | 2/1926 | Liebing et al. | 73/113 |
| 2,599,699 | 6/1952 | Dilworth et al. | 123/514 |
| 3,817,273 | 6/1974 | Erwin, Jr. | 123/510 |
| 4,314,539 | 2/1982 | Schade | 123/514 |
| 4,385,615 | 5/1983 | Kgang | 123/514 |

FOREIGN PATENT DOCUMENTS

| | | | |
|---|---|---|---|
| 610248 | 10/1948 | United Kingdom | 123/514 |
| 1573703 | 8/1980 | United Kingdom | 123/514 |
| 2044399 | 10/1980 | United Kingdom | 123/514 |

*Primary Examiner*—Magdalen Y. C. Moy
*Attorney, Agent, or Firm*—Francis X. LoJacono

[57] ABSTRACT

A fuel-measuring flow system for diesel engines that provides a continuous metered flow of fuel from the storage tank to the operating engine, wherein a flow meter defined by a transducer having a metering orifice therein is located between the tank and injector pump of the engine to establish an accurate reading as to the amount of fuel being used by the engine, the returning unburned fuel being cooled and mixed with the fuel from the tank after the stored fuel passes through the flow meter. The system further includes a relay-valve device and a manifold member whereby the unburned fuel and stored fuel are mixed together prior to being pumped to the engine.

5 Claims, 3 Drawing Figures

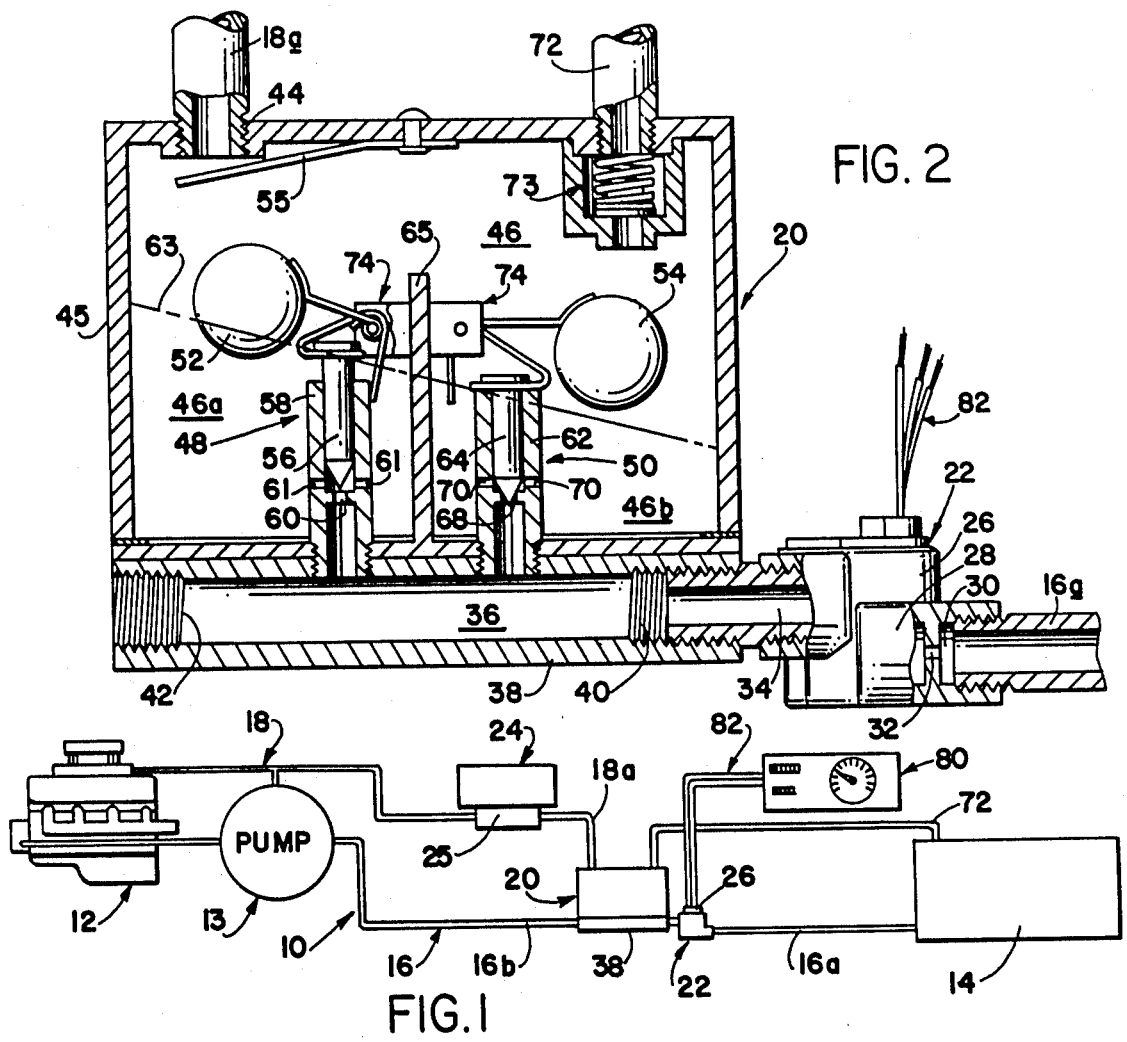
FIG. 2
FIG. 1
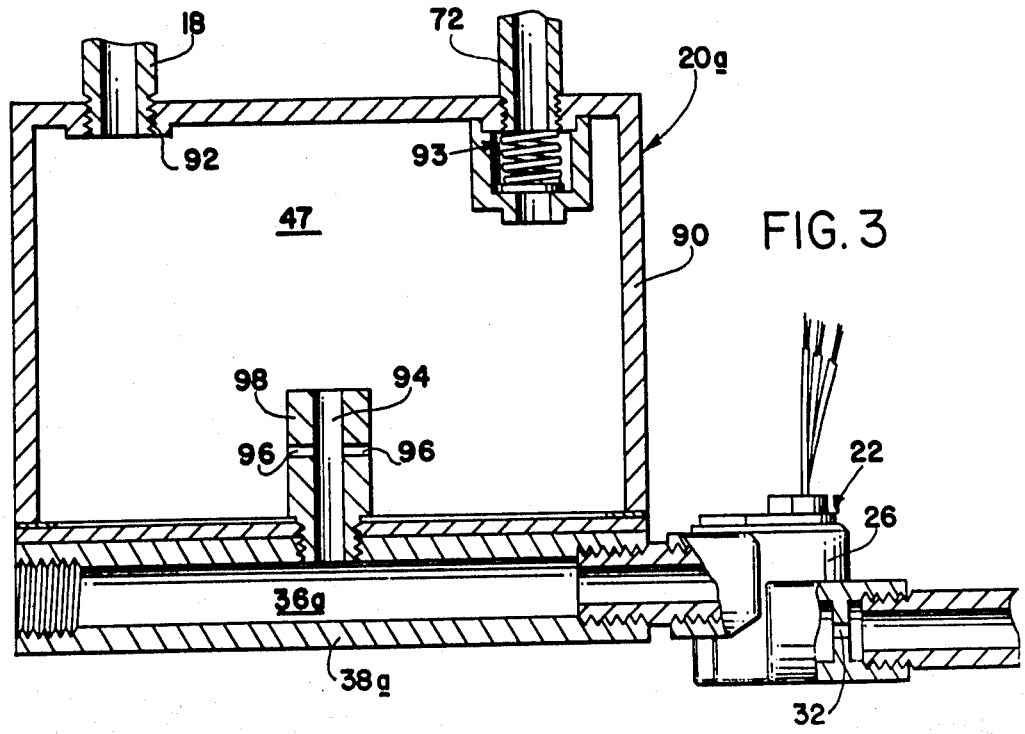
FIG. 3

FUEL-MEASURING FLOW SYSTEM FOR DIESEL ENGINES

BACKGROUND OF THE INVENTION

1. Field of the Invention

This invention relates generally to a fuel system for diesel engines, and more particularly to a closed, vacuum, diesel-fuel system having a fuel-measuring flow-control valve and sensor device.

2. Description of the Prior Art

As is well known in the art, various problems and difficulties are being encountered in providing suitable means for controlling and recording the amount of diesel fuel being used during the operation of a diesel engine as well as providing a suitable means to prevent air bubbles from entering the fuel-flow system.

In many diesel-engine fuel systems fuel is pumped from the fuel tank and is forced under pressure to the fuel injectors. Since a continuous flow of fuel is pumped to the injectors, there must also be provided a return-flow line, which in the past usually returned the excess fuel back to the tank by using a gravity-flow system. Gravity return-flow systems create their own problems, one being that fuel can not be fed directly into the main flow line going to the engine. Such an arrangement would normally interrupt the main flow in several ways.

One inherent problem is that the unburned returning diesel fuel will generally accummulate air bubbles. Thus, past systems have, by necessity, returned the unburned overflow fuel directly back to the tank, so as to allow the air bubbles to be separated from the fuel before returning through the main flow line.

Still another problem with diesel-fuel systems is that the returning unburned fuel must be cooled prior to being injected into the engine, since hot fuel will cause the engine to malfunction or operate in an inefficient manner.

However, various fuel systems and related fuel-operating-and-metering components have been tried and are being employed in an attempt to overcome the above-mentioned problems. Some of these systems and devices can be found in the following United States patents.

Fuel System for Diesel Engines, U.S. Pat. No. 3,672,394, is designed for treating diesel fuel wherein a meter is used in the system having a by-pass provided around the meter which includes a single metering valve, so that the by-pass can be used when it is desired that the flow not be measured.

U.S. Pat. No. 3,750,463 is a fuel-measuring system that includes a fuel-mixing device which returns unburned fuel to the fuel supply. As stated, "A valve is included in the system which has two positions a first one of which provides normal flow of fuel to the fuel mixing device and a second one of which provides flow through the by-pass to measure the flow. The valve is operably connected to the emergency brake or a power take-off so that it is moved to its second position when the emergency brake or power take-off is activated."

A fuel-use-rate meter is disclosed in U.S. Pat. No. 3,805,602. This meter is designed to accurately measure volume or weight of fuel consumed by an engine per unit of time.

Another fuel system for diesel engines is disclosed in U.S. Pat. No. 3,816,263 and is designed for treating liquid which may comprise as one instance means for cooling liquid. It also includes a by-pass around a meter when it is desired that the flow not be measured.

U.S. Pat. No. 3,949,602 relates to a meter capable of accurately measuring volume or weight of fuel consumed by an engine per unit of time.

Even with the existing systems that are available, there are still inherent problems to be solved. There is a need for an accurate fuel measurement in diesel-fuel systems, since providing a meter in the outflow line from the fuel tank would not only measure the fuel to be burned by the engine, but would also include the fuel which is constantly being returned to the fuel tank that was not originally consumed.

SUMMARY OF THE INVENTION

Accordingly, the present invention has for an important object to provide a diesel-fuel system for diesel engines that overcomes the existing inherent problems with such systems. Thus, the present invention provides a closed diesel-fuel system that is capable of accurately measuring the flow of fuel from the tank to the engine by means of a novel fuel-flow sensor which establishes reliability and a wide flow range.

Another object of the invention is to provide a transducer-type flow sensor that will operate effectively under low-pressure drop, and is immune to highly erratic flow conditions which often develop in conventional diesel-fuel systems as well as in fuel systems that utilize a return-fuel re-routing into a reservoir or cannister in order to measure flow of fuel by means of a positive-displacement-type meter.

Still another object of the invetion is to provide a diesel-fuel-flow system wherein the transducer-type flow sensor will be able to meet all of the requirements at a reasonable cost.

Yet another object of the invention is to provide a fuel-measuring flow system for diesel engines wherein the system further includes a relay valve that is positioned in the system so as to be located between the injector pump and the transducer, the fuel-return flow being directly connected to the relay valve, allowing the return fuel (not consumed) to enter the fuel-injector feed line in front of the flow-metering unit, which then only receives fuel from its fuel tank.

It is another object of the invention to provide a fuel-measuring flow system of this character wherein the flow transducer is utilized with a fuel-relay valve so as to create a pressure differential on the upstream side of the transducer, thereby causing rapid movement of the diesel fuel through the return-line system. This rapid movement of fuel compensates for the loss of pressure across the orifice of the transducer.

It is still another object of the present invention to include a relay-valve device in the fuel-flow system that additionally provides a means to cool the returning fuel and to, at the same time, dissipate the air bubbles from the fuel as it passes through the relay valve to the injector line.

A further object of the invention is to provide a system of this character that includes a measuring device, such as a transducer, that is provided with a restriction orifice which is used in conjunction with an orifice or orifices of a given size located within the valve relay, so that a combination of orifices assists fuel through the fuel-return line and into the fuel manifold, thereby compensating for the interference that might be caused by the transducer orifice in the normal flow of fuel to the engine from the main fuel reservoir.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 1 is a diagrammatic view of a fuel-measuring system incorporating the present invention therein;

FIG. 2 is an enlarged cross-sectional view of the relay valve and the associated flow control and fuel-metering transducer are employed in the diagram of FIG. 1; and FIG. 3 is a cross-sectional view similar to FIG. 2, illustrating an alternative arrangement of the relay valve.

DESCRIPTION OF THE PREFERRED EMBODIMENT

Referring more particularly to FIG. 1, there is shown a fuel-measuring flow system, generally indicated at 10, which is particularly designed for use with diesel engines, as represented by numeral 12. Diesel engine 12 is interconnected to fuel tank 14 by fuel line 16, which will also be referred to as the "feed line", that allows fuel stored in tank 14 to flow to engine 12, thereby allowing diesel fuel to be injected therein in the well known manner.

As typical in most diesel fuel systems, there is included a suitable injector pump means 13 that forceably injects fuel into the engine while allowing excess fuel, not burned, to constantly recirculate through return-flow line 18. Generally, this line is directly connected back to tank 14. However, in this present arrangement return line 18 is connected so as to communicate with a relay-valve means, designated at 20. Relay valve means 20 is also connected to and communicates with feed line 16, thereby bypassing tank 14.

As will be described herein, relay valve 20 serves more than one purpose. It provides a means to regulate the flow of returning fuel from line 18 into feeding line 16, it establishes a means to compensate for the flow interference in feed line 18 which can be caused by flow-metering means 22, and it further provides a means to dissipate air bubbles in the fuel as well as to assist in cooling the returning fuel that is heated as it passes through the system.

Also shown in return line 18 is an optional component 24 which represents a heat-exchanger means having a thermostatic temperature-control means 25, both means being required in some systems, depending upon the engine's environment. Generally, a stationary or fixed diesel engine becomes very hot and causes the returning fuel to become heated to the point where the engine becomes inoperable.

Accordingly, fuel normally flows from fuel tank 14 to pump 13 under a vacuum caused by pump 13. Since most diesel engines require a certain amount of fuel to lubricate and cool the pump 14 and the fuel injectors (not shown), more fuel is drawn into the engine 12 than the engine actually consumes during its combustion process. As previously mentioned, this excess fuel generally returns to its main fuel tank or reservoir 14 by means of a fuel-return line (such as line 18) and is again mixed with stored fuel, thereby cooling and thus repeating the cycle again. This arrangement, however, is not conducive to providing an accurate reading of burned fuel or whatever is left in the storage tank.

In the present invention, fuel flows from the main fuel tank or reservoir 14 from feed-line section 16a, the feed-line section being connected to flow-metering means 22 which comprises a suitable fuel-flow transducer 26 which emits an electrical signal in proportion to the amount and rate of fuel passing therethrough. The transducer comprises a housing 28 which includes inlet 30 to which line 16a is secured. Inlet 30 is provided with a flow-restrictive orifice 32 to establish a given amount of continuous flow through housing 28, so as to enable the fuel to pass from outlet 34 and into mixing chamber 36 of manifold 38, as shown in FIG. 2.

Accordingly, manifold 38 also includes inlet portion 40 and outlet portion 42 wherein the intermediate portion is connected to relay valve 20, so as to receive the returning flow of fuel from relay valve 20. The returning fuel is passed into chamber 36 so as to mix with fuel coming from tank 14. Together, the mixed fuel is pumped as previously described into engine 12 and its injectors, with the excess again returning to the relay valve. However, as shown in FIG. 1, the returning fuel in line 18 is diverted to pump 13, whereby the returning fuel is forced to pass through heat exchanger 24 for cooling prior to its entering relay valve 20. Line 18a interconnects heat exchanger 24 to the inlet port 44 formed in valve housing 45. The controlled temperature of the fuel entering inlet port 44 is established by the thermostat 25 which sets the temperature within a given range for optimum efficiency.

Housing 45 defines the relay valve's plenun chamber 46 into which returning fuel is received while engine 12 is operating. In this embodiment, plenum chamber 46 is constructed of a suitable size so that an insignificant amount of diesel fuel is allowed to remain in the chamber. Fuel is returned directly back to engine 12 by means of valves 48 and 50 which are arranged to communicate with manifold 36 downstream from outlet port 34 of transducer 26.

As the return fuel enters plenum chamber 46 through inlet 44, it is deflected by a deflector means 55 to prevent it from interfering with the operation of the floats 52 and 54 of the respective valve means 48 and 50. A deflector member 55 is positioned below and adjacent inlet 44, as seen in FIG. 2, whereby the deflector is secured to one of the housing walls. Thus, as fuel enters and fills plenum chamber 46, it rises to the level of float 52 (first stage float), causing needle valve 56 in valve body 58 to rise. As needle 56 moves upwardly, discharge orifice 60 is opened by way of meter orifice 61, thereby providing communication between plenum chamber 46 and manifold chamber 36. Since main line 16 is under vacuum, it is desirable to isolate this line from atmosphere when the engine is not running. If atmosphere were allowed to enter fuel line 16, pump 13 would not operate at its peak efficiency. For this reason the pair of floats 52 and 54 are utilized together with their respective valve means 48 and 50. (Note that valve means 48 is shown opened and valve means 50 is shown closed.)

It should be mentioned at this time that it is contemplated that a dual-valve-type relay will be employed when engine 12 is used in a non-stationary mode such as in a vehicle; while the use of a single-valve arrangement (that is, without the need for valve means 50) is contemplated when the engine is mounted in a stationary mode.

Accordingly, each valve means also comprises a like body member 62 having needle valve 64 slidably mounted therein, the needle being attached to float 54 in the same manner as needle 56 is attached to float 52. Each float is operably mounted to a central baffle wall 65, whereby plenum chamber 46 is divided somewhat into two sections 46a and 46b. If the relay-valve unit 24 is angularly disposed, one or the other valve means will always be in operation while the engine is running.

As an example, if a vehicle having a diesel system travels down a steep incline, fuel will fill chamber section 46a (note the phantom line 63 representing fuel disposition), and valve means 48 will be the primary operative valve when the vehicle is on a level plane. When the vehicle is going up a steep grade, fuel will fill chamber section 46b, causing float 54 to rise and operate valve 50 and allowing needle valve 56 to rise and open orifices 68 and 70. Fuel will then flow uninterrupted into manifold chamber 36, and mix with fuel coming from tank 14 under a controlled condition at all times as long as the engine is running.

Thus, as soon as the engine is started, return fuel entering chamber 46 will cause float 52 to rise, thereby lifting needle 56 and allowing fuel to pass through the two opposing orifices 61, and into and through orifice 60. Outlet orifices 60 and 61 are located adjacent the bottom or lower area of chamber 46, and are of sufficient size so that there is always fuel in chamber 46, since more fuel will flow through inlet 44 than through orifices 60 and 61. The same is true for valve 50 when it is in operation.

When one of the needle valves 56 or 64 is opened, the pressure differential between the manifold chamber 36 and the orifice 32 of the transducer—which is creating a restriction in fuel line 16—will cause return fuel to be very rapidly drawn out of orifice 60 or 68, thereby compensating for the restriction caused by orifice 32. Return fuel is then blended in manifold chamber 36 with only enough fuel from orifice 32 to allow the engine to operate in a normal manner. Fuel is drawn into line 16b, and continues on to pump 13 and then into engine 12. A safety line 72 having a one-way valve 73 is provided in order to move fuel back to the main fuel reservoir 14 in the event of a malfunction in the relay-valve unit 24. Central wall 64 acts as a baffle to prevent fuel from sloshing in plenum chamber 46, as well as acts as a means to support the float mechanism, generally indicated at 74.

Thus, it can be seen that a very accurate reading can take place as fuel from tank 14 passes through transducer 26 which is connected to a suitable meter-recording means 80 by wires 82. The meter-recording means provides a readout of the used fuel, records the fuel used, and includes a dial meter to establish instantaneous MPG, with auxiliary scales for GPH and MPH.

Referring to FIG. 3, there is shown an alternative arrangement of a relay valve which illustrates a floatless valve, generally indicated at 24a. The construction of this relay is basically the same as previously described for relay valve 20. In other words, it includes housing 90 having inlet 92 which connected by return line 18 at one side of the housing, the second line 72 being connected to the housing and having a one-way-check-valve means 93 disposed in chamber 47a. However, in this arrangement there are no floats or needle valves provided to control the entrance of atmospheric pressure into the fuel manifold 38a when the engine is not running. This configuration is useful on stationary engines whose position in relation to the fuel-line level remains fixed.

When floatless relay valve 24a is employed, it will generally include heat exchanger 24 in order to cool the fuel as it enters chamber 46a through inlet 92. The fuel will flow uninterrupted to orifice or passage 94 and into the manifold chamber 36a. Thus, the pressure differential caused by orifice 32 in transducer 26 forces fuel through orifice 94, such as in the manner previously described. Check valve 93 prevents atmospheric pressure from entering the relay valve. When engine 12 is stopped, any pressure built up in the system will be vented through outline 72 and back to tank 14. In the event of stoppage of fuel through discharge orifice 94, check valve 93 will open, allowing fuel to escape back to main fuel reservoir or tank 14. The two opposing orifices 96 in orifice member 98 define accelerator jets that hasten the movement of fuel through orifice 94.

Since a flow transducer makes it possible to measure the flow of fuel through electrical means, it is now possible to segregate taxable fuel for on-road usage from non-taxable fuel for offroad usage, or for power take-off use as would be the case with a refuse truck when it is in the compaction mode.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A fuel-measuring flow system for diesel engines, comprising:

a fuel tank for storing fuel therein having a fuel outlet and an inlet vent, said fuel outlet being interconnected to said engine by a fuel line;

a fuel-injector-pump means mounted in said fuel line to pump fuel from said fuel tank when said engine is running;

a relay-valve means mounted in said fuel line and interposed between said tank and said pump means, said relay-valve means including a discharge orifice, an inlet, and a controlled outlet vent, said outlet vent being connected to said tank;

said relay-valve means defining a chamber interposed between said inlet and said discharge orifice to receive unburned fuel therein as said engine is running; and said relay-valve means including a first float-valve means adapted to control a first discharge orifice and a second float-valve means adapted to control a second discharge orifice;

said first and second float-valve means being mounted to a central baffle wall which defines first chamber section and a second chamber section, and each of said float-valve means being positioned within respective chamber sections whereby fuel can flow continuously from at least one chamber section, regardless of the angular displacement of said chamber while said engine is running;

a flow-metering means defined by a transducer having a flow-restrictive orifice to establish a given amount of continuous flow therethrough, said flow-metering means including a meter-recording means to record all fuel as it leaves said tank;

a manifold having a mixing chamber wherein said transducer is connected upstream thereof, whereby fuel passes from said flow-restrictive orifice into said mixing chamber under vacuum, and wherein said discharge orifice of said relay valve is arranged to communicate with said mixing chamber downstream of said flow-restrictive orifice; and a fuel-return line adapted to be connected to said pump means and said relay-valve means for feeding unburned fuel in a controlled manner into said manifold downstream of said transducer whereby only fuel from said tank is metered.

2. A fuel-measuring flow system as recited in claim 1, wherein each of said float-valve means comprises:

a valve body mounted within said relay valve and adapted to be connected to said manifold;

a needle valve adapted to engage said discharge orifice;

a float means operably attached to said needle valve to cause said needle valve to open or close with respect to the position of the fuel in said relay valve; and at least one meter orifice disposed in said valve body and positioned above said discharge orifice, said meter orifice and said discharge orifice being positioned adjacent the bottom portion of said relay valve, whereby fuel therein covers said orifices to prevent air flow therethrough.

3. A fuel-measuring flow system as recited in claim 2, wherein said relay valve includes a fuel-deflector means positioned to deflect fuel as it enters a fuel chamber defined by said relay valve.

4. A fuel-measuring flow system as recited in claim 1, including a heat-exchanger means connected to said fuel-return line, and interposed between said engine and said relay-valve means, whereby said returning unburned fuel is cooled prior to mixing with fuel from said tank.

5. A fuel-measuring flow system as recited in claim 2, including a heat-exchanger means connected to said fuel-return line, and interposed between said engine and said relay-valve means, whereby said returning unburned fuel is cooled prior to mixing with fuel from said tank.

* * * * *